(12) United States Patent
Sun et al.

(10) Patent No.: US 8,547,917 B2
(45) Date of Patent: Oct. 1, 2013

(54) NETWORK DRIVEN L3 CONTROL SIGNALLING PRIORITIZATION

(75) Inventors: Ying Sun, Sollentuna (SE); Christian Skärby, Stockholm (SE); Gunnar Peters, Stockholm (SE); Kelvin Maliti, Märsta (SE); Krister Norlund, Göteborg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 136 days.

(21) Appl. No.: 12/935,025

(22) PCT Filed: Mar. 28, 2008
(Under 37 CFR 1.47)

(86) PCT No.: PCT/SE2008/050360
§ 371 (c)(1),
(2), (4) Date: May 20, 2011

(87) PCT Pub. No.: WO2009/120120
PCT Pub. Date: Oct. 1, 2009

(65) Prior Publication Data
US 2012/0044880 A1   Feb. 23, 2012

(51) Int. Cl.
*H04W 4/00* (2009.01)

(52) U.S. Cl.
USPC ........................................... 370/329; 370/338

(58) Field of Classification Search
USPC ................ 370/232, 235, 252, 253, 278, 328, 370/338, 395.4
See application file for complete search history.

(56) References Cited

U.S. PATENT DOCUMENTS

2003/0219037 A1* 11/2003 Toskala et al. ................ 370/496
2012/0281654 A1* 11/2012 Aiba et al. .................... 370/329

* cited by examiner

*Primary Examiner* — Warner Wong

(57) ABSTRACT

A node of a radio access network includes a transceiver and a radio resource control unit. The transceiver is configured to facilitate communication with plural wireless terminals over a radio interface including transmissions on an uplink from the wireless terminals to the node and transmissions on a downlink from the node to the wireless terminals.
The radio resource control unit configured to perform radio resource control functionality including layer three (L3) signaling between the node and the wireless terminals. The radio resource control unit includes an uplink scheduler configured to predict transmission of an uplink L3 message from the wireless terminals to the node and, for a particular wireless terminal, to generate, for transmission on the downlink, a grant message which in accordance with the prediction prioritizes a predicted L3 message of the particular wireless terminal relative to messages of others of the plural wireless terminals.

14 Claims, 7 Drawing Sheets

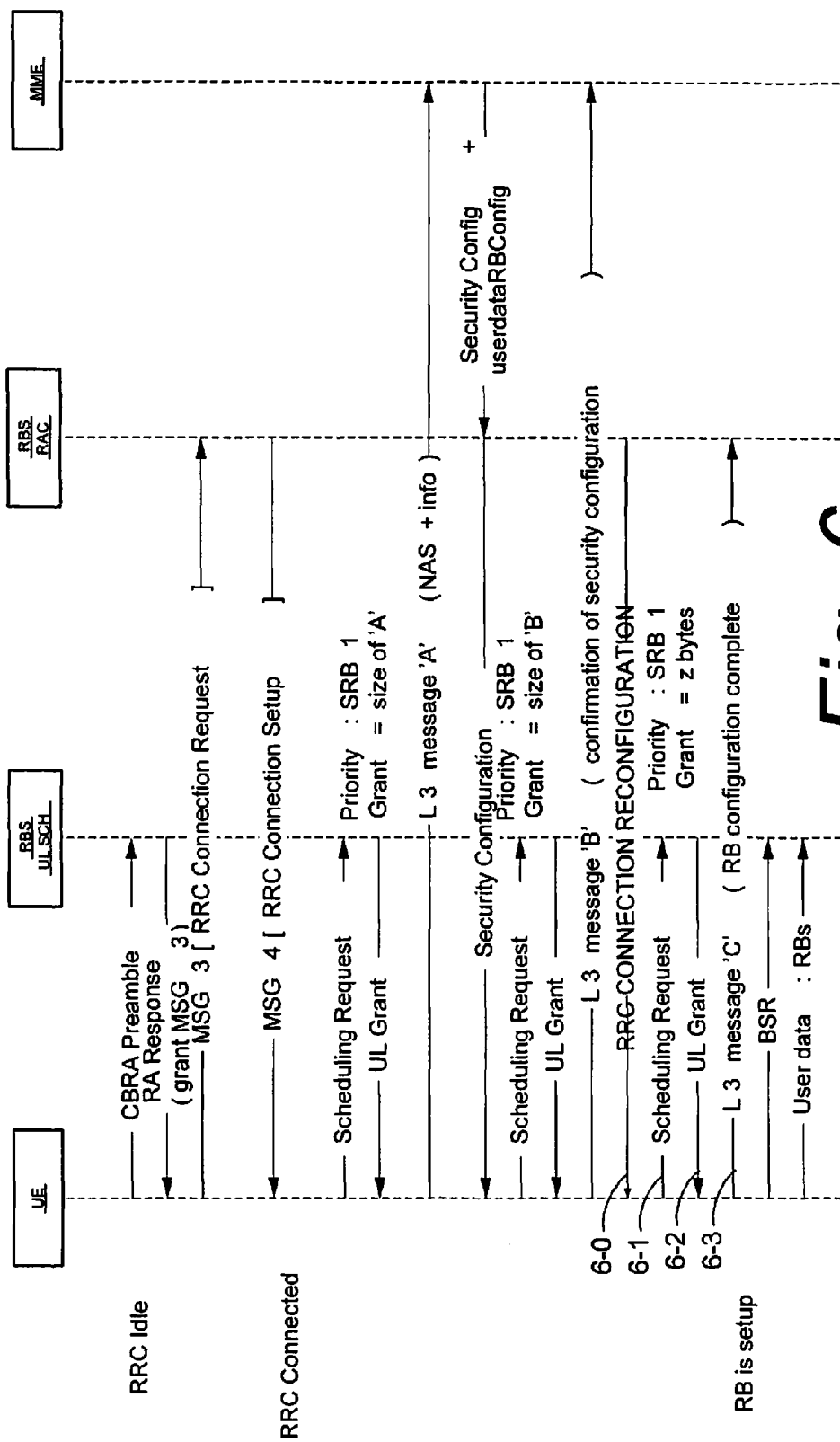

NETWORK DRIVEN L3 CONTROL SIGNALLING PRIORITIZATION

BACKGROUND

I. Technical Field

This invention pertains to telecommunications, and particularly prioritization of communications on an uplink from plural wireless terminals to a radio access network node.

II. Related Art and Other Considerations

In a typical cellular radio system, wireless terminals (also known as mobile stations and/or user equipment units (UEs)) communicate via a radio access network (RAN) to one or more core networks. The wireless terminals can be mobile stations or user equipment units (UE) such as mobile telephones ("cellular" telephones) and laptops with wireless capability), e.g., mobile termination), and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station, e.g., a radio base station (RBS), which in some networks is also called "NodeB" or "B node" or "eNodeB". A cell is a geographical area where radio coverage is provided by the radio base station equipment at a base station site. Each cell is identified by a identity within the local radio area, which is broadcast in the cell. The base stations communicate over the air interface operating on radio frequencies with the user equipment units (UE) within range of the base stations.

In some versions (particularly earlier versions) of the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UTRAN is essentially a radio access network using wideband code division multiple access for user equipment units (UEs). The Third Generation Partnership Project (3GPP) has undertaken to evolve further the UTRAN and GSM based radio access network technologies.

Specifications for the Evolved Universal Terrestrial Radio Access Network (E-UTRAN) are ongoing within the 3$^{rd}$ Generation Partnership Project (3GPP). The Evolved Universal Terrestrial Radio Access Network (E-UTRAN) comprises the Long Term Evolution (LTE) and System Architecture Evolution (SAE).

Long Term Evolution (LTE) is a variant of a 3GPP radio access technology wherein the radio base station nodes are connected directly to a core network rather than to radio network controller (RNC) nodes. In general, in LTE the functions of a radio network controller (RNC) node are performed by the radio base stations nodes. As such, the radio access network (RAN) of an LTE system has an essentially "flat" architecture comprising radio base station nodes without reporting to radio network controller (RNC) nodes.

The evolved UTRAN (E-UTRAN) comprises evolved base station nodes, e.g., evolved NodeBs or eNBs, providing evolved UTRA user-plane and control-plane protocol terminations toward the user equipment unit (UE). The eNB hosts the following functions (among other functions not listed): (1) functions for radio resource management (e.g., radio bearer control, radio admission control), connection mobility control, dynamic resource allocation (scheduling); (2) mobility management entity (MME) including, e.g., distribution of paging message to the eNBs; and (3) User Plane Entity (UPE), including IP Header Compression and encryption of user data streams; termination of U-plane packets for paging reasons, and switching of U-plane for support of UE mobility. The eNB hosts the PHYsical (PHY), Medium Access Control (MAC), Radio Link Control (RLC), and Packet Data Control Protocol (PDCP) layers that include the functionality of user-plane header-compression and encryption. The eNodeB also offers Radio Resource Control (RRC) functionality corresponding to the control plane. The eNodeB performs many functions including radio resource management, admission control, scheduling, enforcement of negotiated UL QoS, cell information broadcast, ciphering/deciphering of user and control plane data, and compression/decompression of DL/UL user plane packet headers.

The Layer 3 (L3) of the LTE radio access network (RAN) contains the Radio Resource Control (RRC) functionality of the radio network. Examples of RRC functionality are RRC connection setup, bearer setup, and handover procedures and configuration of measurements. The L3 control signaling carries information between the RRC layer in RAN and the corresponding layer in the wireless terminals (e.g., UEs), and is carried over so-called Signaling Radio Bearers (SRB) on the Physical Uplink Shared Channel (PUSCH) and Physical Downlink Shared Channels (PDSCH). The user plane data is carried on ordinary Radio Bearers (RB), which is also mapped to the PUSCH and PDSCH.

The performance of L3 control signaling, in terms of delay, directly impacts the quality of service (QoS) of the user plane data transmission. Since the L3 signaling and the user plane data are carried on the same physical channels (the PUSCH and PDSCH), the Signaling Radio Bearers (SRBs) need to be prioritized relative to other radio bearers. The allocation of PDSCH and PUSCH, to different radio bearers and Signaling Radio Bearers (SRBs), is administrated by a scheduler(s) which is/are situated in the eNodeB. A task of a the scheduler is to prioritize different transmissions from different wireless terminals and to allocate the resources (including the uplink resources) efficiently.

There are three types of Signaling Radio Bearers (SRBs). A first type of Signaling Radio Bearer (SRB) is SRB0, which is carried in CCCH. A second type of Signaling Radio Bearer (SRB) is SRB1, for NAS messages and for most RRC messages, all using DCCH logical channel. A third type of Signaling Radio Bearer (SRB) is SRB2, which is for high-priority RRC messages, using DCCH logical channel. The differences between these types of Signaling Radio Bearers (SRB) are described in 3GPP TS 25.331 V8.1.0 (2007-12), 3rd Generation Partnership Project; Technical Specification Group Radio Access Network; Radio Resource Control (RRC); Protocol Specification (Release 8).

In downlink, prioritization of resources between wireless terminals is easy to achieve since the network controls and knows the type of data that the network wants to transmit to the different wireless terminals. However, in uplink, the network does not have information about the types of transmissions the wireless terminals want to send to the network until it receives a Buffer Status Report (BSR) from the wireless terminals. The Buffer Status Report (BSR) includes detailed information about the buffers of the wireless terminal from which the Buffer Status Report (BSR) is sent. In the Buffer Status Report (BSR), the size of the buffers per radio bearer (RB) group is reported (a radio bearer (RB) group is a group of similar radio bearers (RBs).

A Buffer Status Report (BSR) includes, among other things, information about the type of radio bearers (RBs) in the buffer of the wireless terminal, so that from the Buffer Status Report (BSR) the presence of a Signaling Radio Bearer (SRB) in the buffer can be discerned. If a Signaling Radio Bearer (SRB) is present in the Buffer Status Report (BSR) for a particular wireless terminal, the network can prioritize the corresponding wireless terminal.

However, in order to transmit a Buffer Status Report (BSR) from a wireless terminal to the network, an uplink grant from the network to the wireless terminal is required. Initially, the wireless terminal does not have any such uplink grant, and therefore the wireless terminal must send a special communication known as a Scheduling Request (SR) on the PUCCH to the network to apply for (e.g., request) resources for transmission of the Buffer Status Report (BSR). The Scheduling Request (SR) is only one bit in length. In view of the small size of the Scheduling Request (SR), no detailed information about the radio bearers (RB) in the buffer of the request wireless terminal can be obtained from the Scheduling Request (SR). So the Scheduling Request (SR) itself provides no basis for knowing buffer content or prioritizing communications. In other words, upon reception of a mere Scheduling Request (SR), the eNodeB cannot prioritize the Signaling Radio Bearer (SRB) over other Radio Bearers since it does not yet know of the Signaling Radio Bearer (SRB).

A current approach to the prioritization of Signaling Radio Bearers (SRBs) in the uplink is described FIG. 1. The approach is based on, e.g., involves, the Buffer Status Report (BSR). When the eNodeB receives a Scheduling Request (SR), the eNodeB sets the priority level to between the priority level of the Signaling Radio Bearer (SRB) and the normal data radio bearer (RB) priority level since the eNodeB does not know what data is in the buffers of the wireless terminal.

Ordinarily the scheduler of the eNodeB will choose which wireless terminal is allowed to transmit, with the wireless terminals being granted transmission rights in accordance with a decreasing priority level. In other words, the wireless terminal with the highest priority level is granted first transmission, the wireless terminal with the second highest priority level is granted second transmission, and so forth. If and when a wireless terminal is scheduled to transmit, the scheduler (together with the link adaptation function) issues a grant to the wireless terminal. The grant indicates the size of the coded transport block that the wireless terminal is allowed to transmit. The transport block generally includes the physical layer data unit which the wireless terminal wants to transmit over the air interface to the eNodeB, and can also include a Buffer Status Report (BSR). The grant is expressed in bytes, e.g., "x bytes", which is a configurable parameter.

Since the scheduler does not know how much data is currently in the buffer of the wireless terminal, an attempt is made to make the grant size at least larger than the size of a Buffer Status Report (BSR). The size of the grant is typically selected from a fixed table of transport block sizes and should at least be the size of the Buffer Status Report (BSR).

In the wireless terminal the Buffer Status Report (BSR) has absolute highest priority for uplink transmission (in accordance with 3GPP Technical Specifications). Upon the reception of the grant, if the grant size is larger than the total buffer size of the wireless terminal plus the size of the Buffer Status Report (B SR), both user data and the Buffer Status Report (BSR) are transmitted by the wireless terminal. If the grant size is larger than the total buffer size but smaller than the size of the total buffer plus the size of the Buffer Status Report (BSR), the wireless terminal data ("UE data") without the Buffer Status Report (BSR) is transmitted. If the grant size is larger than the size of the Buffer Status Report (BSR), but smaller than the total buffer size plus the size of the Buffer Status Report (BSR), the Buffer Status Report (BSR) plus part of the UE data will be transmitted. Since the Signaling Radio Bearer (SRB) has higher priority than normal traffic data ("UE data"), the wireless terminal will transmit the L3 message first. In other words, the L3 signaling is prioritized.

Several problems attend the existing approach of uplink prioritization. For example, the current approach does not solve the problem that eNodeB has no knowledge about buffer of the wireless terminal before the eNodeB receives a Buffer Status Report (BSR), so the same priority level is set both for wireless terminals having the important L3 signaling and wireless terminals having normal data. When resources are limited, the eNodeB may sacrifice or overlook the wireless terminal that actually has L3 signaling in its buffer.

Another problem with the current approach is that the buffer estimate x attributed to the buffer of a wireless terminal is assumed to be an arbitrary and fixed value. For the case when there is a small amount of data in the buffer of the wireless terminal, the buffer estimate x may be too large and therefore resources can be over allocated. On the other hand, for the case when there is more data in the buffer of the wireless terminal than x bytes, the data will be truncated to two messages and thus add more over head to the communications. An increased number of communications will result in insufficient resource usage, and possibly extra user plane delay. Moreover, as understood from the above, the wireless terminal sending both a Scheduling Request (SR) and a Buffer Status Report (BSR) can waste resources over the air interface and add a large delay before the corresponding L3 signaling is actually sent.

SUMMARY

In one of its aspects, the present technology concerns a method of operating a radio access network to facilitate prioritization of uplink layer 3 (L3) signaling. The method comprises making a prediction of transmission of an uplink layer three (L3) message from a wireless terminal to a node of the radio access network. The method further comprises generating, for transmission on a downlink from the node to the wireless terminal, an uplink grant message which, in accordance with the prediction, prioritizes a predicted L3 message of the wireless terminal relative to messages of others of plural wireless terminals operating in the network. The method also comprises transmitting the uplink grant message to the wireless terminal.

Transmitting of the uplink grant message to the wireless terminal in accordance with the method obviates transmission on the uplink from the wireless terminal of a separate buffer status report message preparatory to transmission of the uplink L3 message from the wireless terminal, thereby advantageously decreasing signaling delay and overhead.

In various alternative and/or cumulative modes, the prediction of the method can be made in different ways. In an example first mode, the prediction can be based on transmission of an evocative downlink L3 message. In a second example mode, the prediction can be based on a pending buffer estimation for a buffer of the wireless terminal. In a third example mode, the prediction can be based on anticipated periodicity of the uplink L3 message.

In an example implementation, the method further comprises generating the uplink grant message to include an uplink transmission allocation prioritization value for the uplink L3 message. In an example implementation, the method further comprises generating the uplink grant message to include an uplink transmission allocation size for the uplink L3 message.

In another of its aspects, the technology concerns a node of a radio access network which can implement the foregoing method. In an example embodiment, the node comprises a transceiver; a radio resource control unit; and an uplink scheduler. The transceiver is configured to facilitate communication with plural wireless terminals over a radio interface including transmissions on an uplink from the wireless terminals to the node and transmissions on a downlink from the node to the wireless terminals. The radio resource control unit is configured to perform radio resource control functionality including layer three (L3) signaling between the node and the wireless terminals. The uplink scheduler is configured to make a prediction of transmission of an uplink L3 message from the wireless terminals to the node and, for a particular wireless terminal for which such prediction is made, to generate, for transmission on the downlink, an uplink grant message which in accordance with the prediction prioritizes a predicted L3 message of the particular wireless terminal relative to messages of others of the plural wireless terminals.

In separate and/or cumulative embodiments, the uplink scheduler can be configured to make the prediction in accordance with the aforementioned modes. Further, in an example implementation, the uplink scheduler is configured to generate the uplink grant message to include an uplink transmission allocation prioritization value for the uplink L3 message. In an example implementation, the uplink scheduler is configured to generate the uplink grant message to include an uplink transmission allocation size for the uplink L3 message.

Thus, the technology attempts to predict uplink transmission based on the network information. The prediction and uplink grant generation is especially applicable for L3 messages which the network knows should be sent response to a downlink L3 message (and the size of the message is known). The prediction and uplink grant generation is also applicable to periodical uplink L3 message transmission. With this method, in many cases, the upcoming uplink L3 message can identified and prioritized. Also the size of the uplink L3 message can be predicted.

Since both the type of signaling and the size of the corresponding message is predicted, the network can cancel the corresponding Buffer Status Report (BSR) and save air interface resources and L3 signaling delay.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 6 is a diagrammatic view showing communications involved in radio resource control message scheduling including prioritization and grant allocation based on a downlink L3 message in an initial setup procedure.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 2:
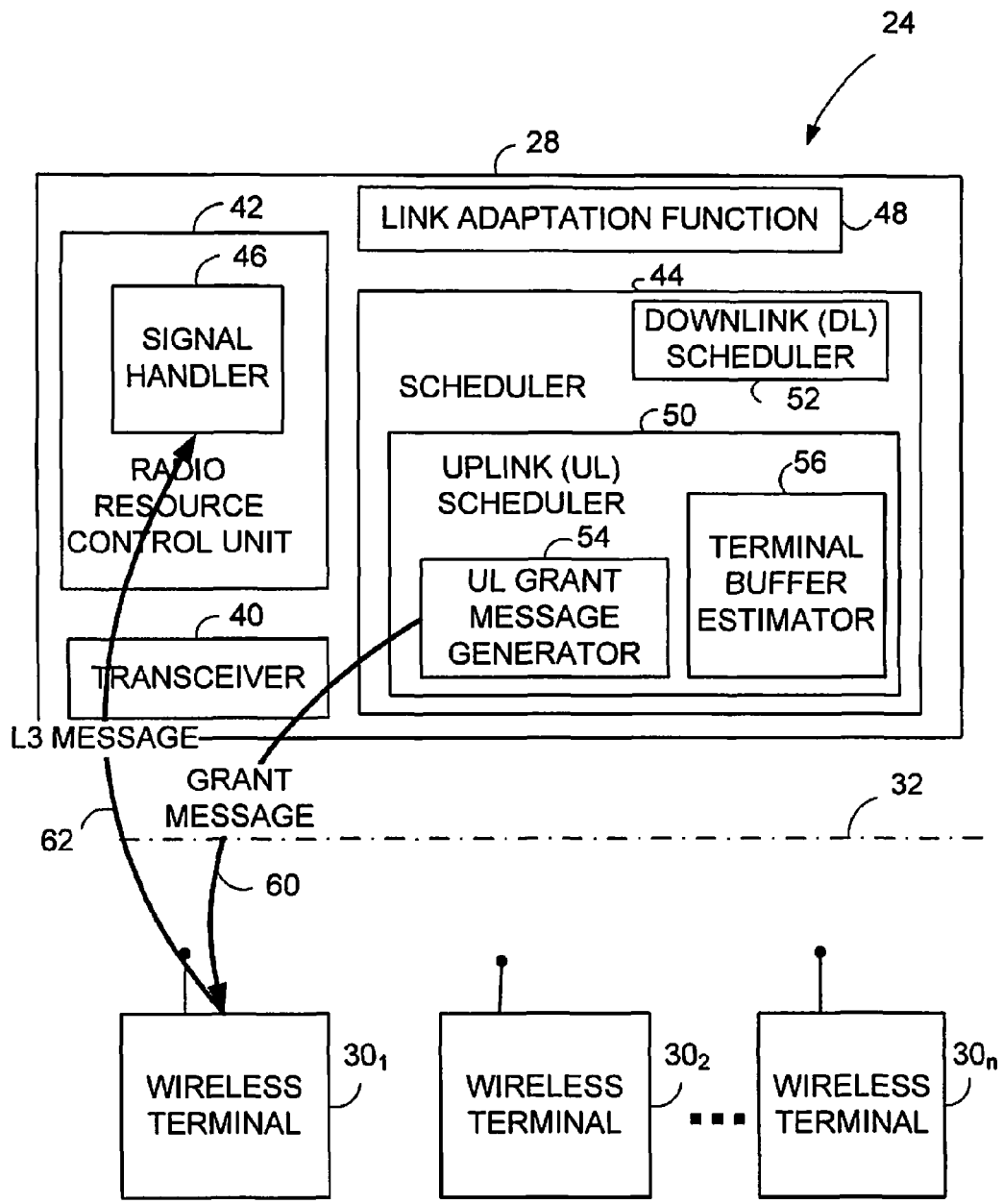
FIG. 2 is a diagrammatic view of portions of a radio access network (RAN) including an example embodiment of a RAN node and capable of L3 uplink message prediction and further including plural wireless terminals.

FIG. 2 illustrates by way of example portions of a representative radio access network (RAN) 24. The radio access network (RAN) 20 comprises an example embodiment of a RAN node 28 (which is capable of L3 uplink message prediction) and plural wireless terminals (WT) 30. In the illustrated embodiment, the RAN node 28 is a base station node, which is some radio access network technologies is also termed "NodeB" or "B node" or "eNodeB". Thus, the RAN node 28 shall also be referred to herein as eNodeB 28. the eNodeB 28 is shown as potentially communicating with the plural wireless terminals (WT) 30 (more particularly shown as wireless terminal $30_1$ through $30_n$) over radio or air interface 32 (depicted by dot-dashed line in FIG. 2 and in other figures).

In the example embodiment of FIG. 2, eNodeB 28 comprises node transceiver 40; node radio resource control unit 42; and node scheduler 44. The node transceiver 40 is configured to facilitate communication with plural wireless terminals (WT) 30 over radio interface 32, including transmissions on an uplink (from the wireless terminals 30 to eNodeB 28) and transmissions on a downlink (from eNodeB 28 to the wireless terminals (WT) 30).

The node radio resource control unit 42 is configured to perform radio resource control functionality including layer three (L3) signaling between the node and the wireless terminals. To this end node radio resource control unit 42 comprises L3 signal handler 46 and a link adaptation function 48 among other constituent functionalities and units. The link adaptation function 48 serves to decide the modulation and coding scheme of the transport block transmitted between the wireless terminal and eNodeB 28, and can comprise a separate unit or be included in other functionalities including node scheduler 44.

The node scheduler 44 of eNodeB 28 comprises both uplink (UL) scheduler 50 and downlink (DL) scheduler 52. As explained herein, uplink (UL) scheduler 50 prioritizes transmission of radio bearers (RBs) from competing wireless terminals (WT) 30. Uplink (UL) scheduler 50 can comprise or co-exist with uplink grant message generator 54 and wireless terminal buffer estimator 56. As uplink (UL) scheduler 50 prioritizes the transmissions from the competing wireless terminals (WT) 30, uplink grant message generator 54 issues one or more message(s) (grant messages) which are sent on the downlink from eNodeB 28 (via node transceiver 40) to the wireless terminals (WT) 30, and which authorize(s) a prioritized wireless terminal(s) 30 to transmit, e.g., send one or more radio bearers (RBs), on the uplink to eNodeB 28. The uplink grant message generator 54 can be either considered as part of node scheduler 44 as shown, or can comprise a separate unit or functionality apart from node scheduler 44.

The functionalities of node radio resource control unit 42, node scheduler 44, and uplink (UL) scheduler 50 and uplink grant message generator 54 in particular, can be realized by one or more (e.g., distributed or shared) controller(s) or processor(s) as those terms are herein expansively explained.

The uplink scheduler 50 is particularly configured and/or arranged to make a prediction of transmission of an uplink L3 message from one or more of the wireless terminals 30 to eNodeB 28. For a particular wireless terminal(s) for which such prediction is made, uplink (UL) scheduler 50 (via, e.g., its uplink grant message generator 54) is further configured to generate, for transmission on the downlink, an uplink grant message. The grant message, in accordance with the prediction, prioritizes a predicted L3 message of the particular wireless terminal relative to messages of others of the plural wireless terminals.

Figure 1:
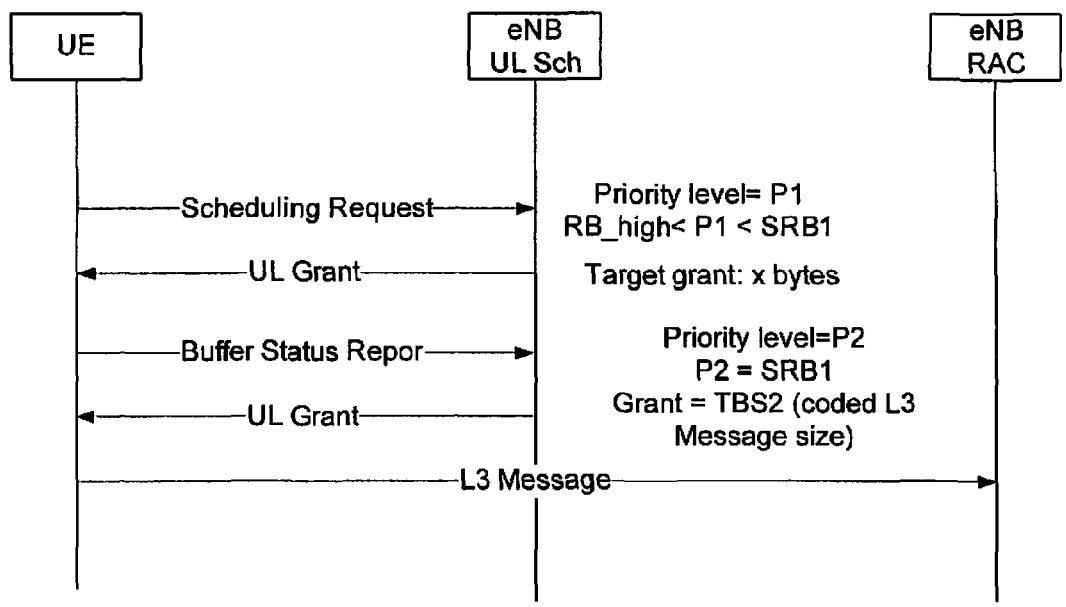
FIG. 1 is a diagrammatic view showing conventional communications involved in radio resource control message scheduling.

As an example of the foregoing, if uplink (UL) scheduler 50 were to predict transmission of an uplink L3 message from wireless terminal $30_1$, uplink (UL) scheduler 50 would prioritize transmission of the uplink L3 message from wireless terminal $30_1$ relative to other awaiting or aspiring uplink (UL) messages from competing wireless terminals (WT) 30. Moreover, through uplink grant message generator 54, uplink (UL) scheduler 50 would issue a grant message to wireless terminal $30_1$ such as grant message 60 as shown in FIG. 1. Thereafter, in accordance with uplink (UL) grant message 60, the prioritized wireless terminal (e.g., wireless terminal $30_1$) can send its uplink L3 message (e.g., L3 message 62 in FIG. 2) to eNodeB 28.

Figure 3:
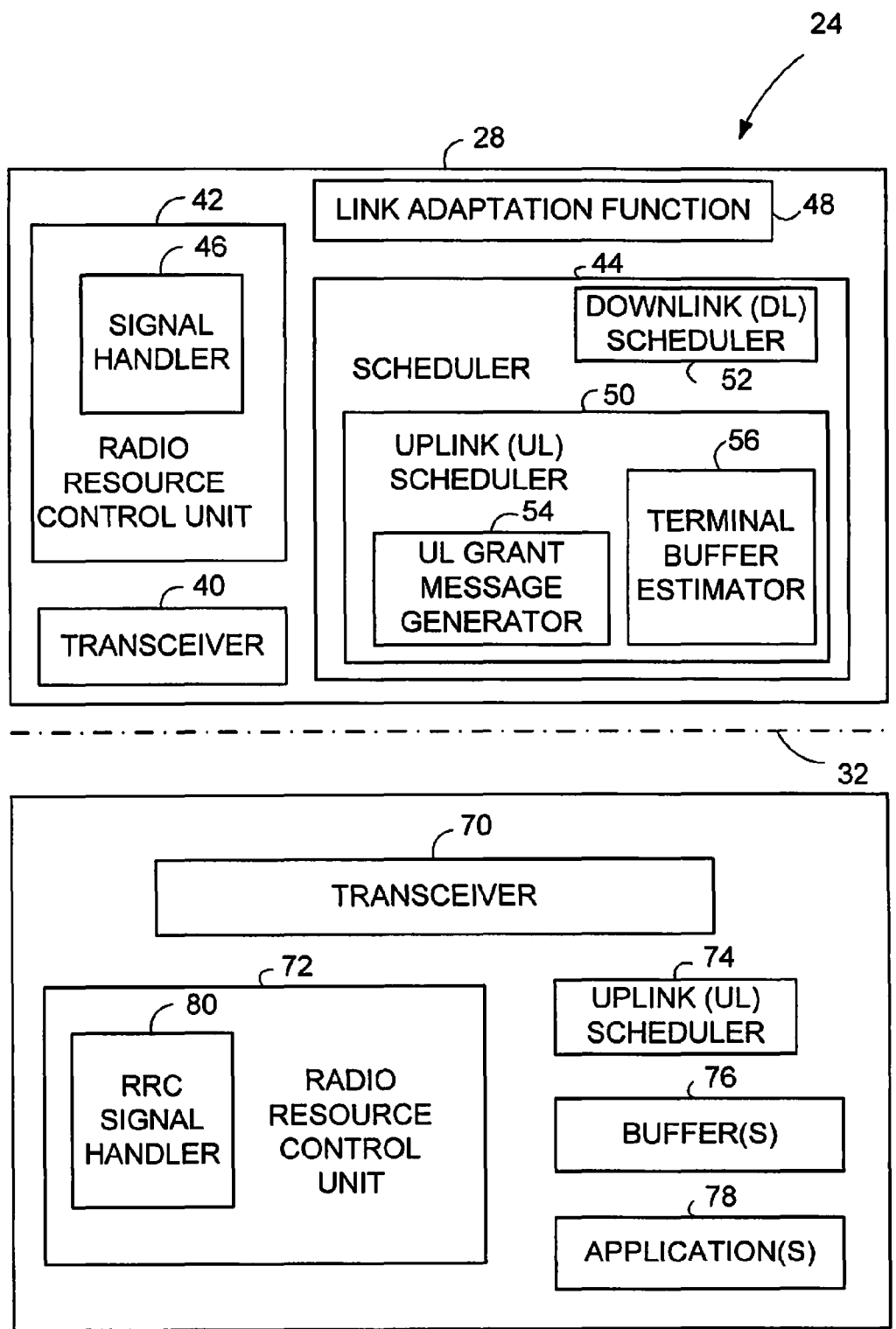
FIG. 3 is a diagrammatic view of portions of a radio access network (RAN) including the example embodiment of the RAN node of FIG. 2 and an example embodiment of a wireless terminal of types suitable for L3 uplink message prediction.

FIG. 3 shows not only example constituency of pertinent aspects of eNodeB 28, but also shows a representative wireless terminal 30 in more detail. The representative wireless terminal 30 comprises terminal transceiver 70; terminal radio resource control unit 72; terminal uplink (UL) scheduler 74; terminal buffer(s) 76; and one or more terminal application(s) 78 which can be executed by or performed by wireless terminal 30. The terminal application(s) 78 can comprise or pertain to one or more services in which wireless terminal 30 can participate or engage over air interface 32. The terminal radio resource control unit 72 can comprise various sub-functionalities or sub-units, such as RRC signal handler 80, for example. Locations of various functionalities or subfunctionalities are typically implementation issues which are addressed by the terminal vendor.

In separate and/or cumulative embodiments, uplink (UL) scheduler 50 of eNodeB 28 can be configured to make the prediction in accordance with various modes, as explained herein. Further, in an example implementation, uplink (UL) scheduler 50 of eNodeB 28 is configured to generate the uplink grant message 60 to include an uplink transmission allocation prioritization value for the uplink L3 message 62. Moreover, in an example implementation, uplink (UL) scheduler 50 of eNodeB 28 is also configured to generate the uplink grant message 60 to include an uplink transmission allocation size for the uplink L3 message 62.

The present technology also concerns a method of operating radio access network (RAN) 24 network in a way to facilitate prioritization of uplink layer 3 (L3) signaling. Basic, representative, non-limiting acts or steps of an example method are illustrated in FIG. 4.

Figure 4:
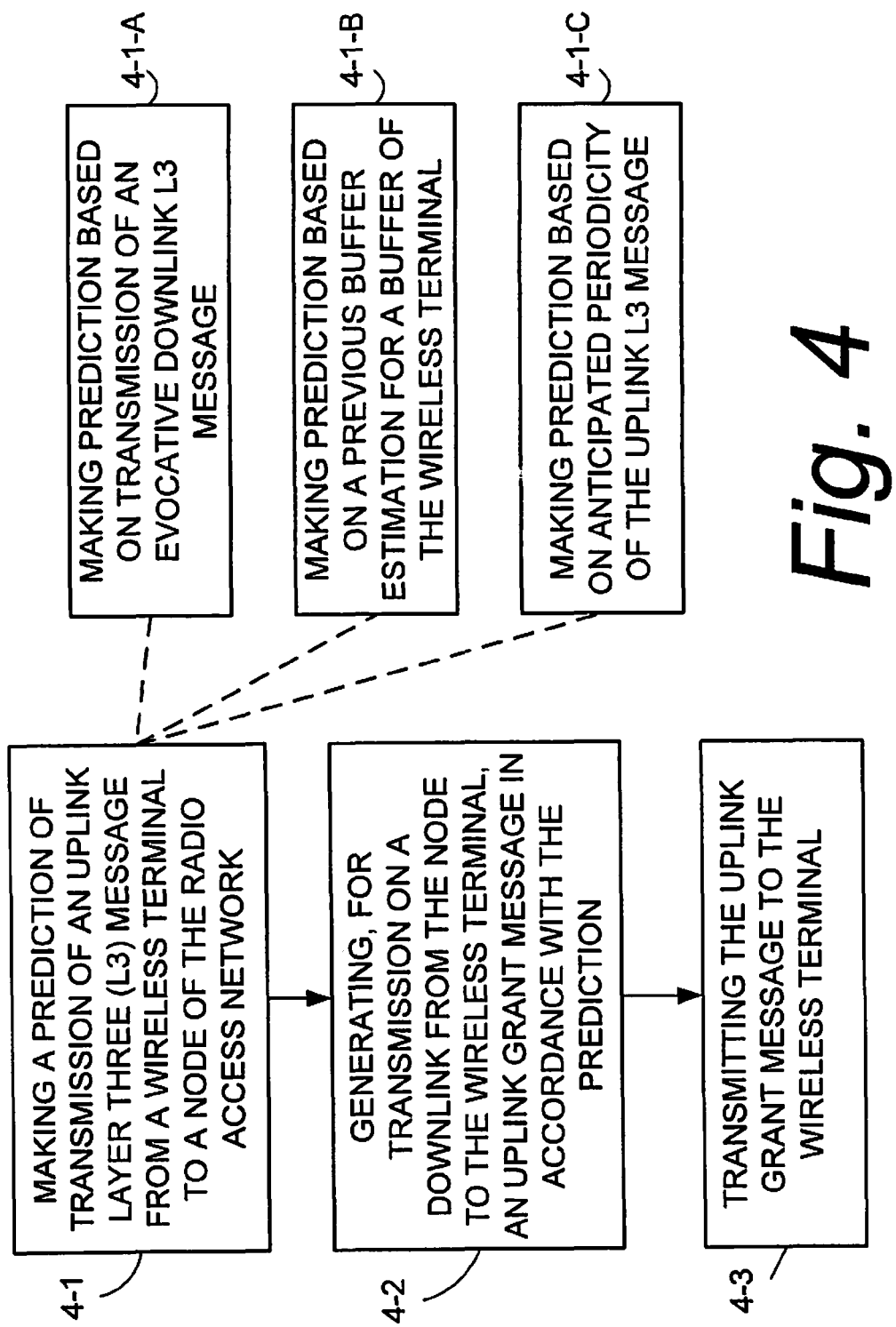
FIG. 4 is a flowchart showing example, basic acts or steps involved in a method of operating the radio access network of FIG. 2 including a feature of L3 uplink message prediction.

Act 4-1 of the example method of FIG. 4 comprises making a prediction of transmission of an uplink layer three (L3) message (e.g., L3 signaling message) from a wireless terminal to eNodeB 28. The particular wireless terminal 30 for which the prediction is made becomes a prioritized wireless terminal in the sense that the predicted message of that particular wireless terminal 30 is prioritized over messages of others of the plural wireless terminals (WT) 30 with which eNodeB 28 is in communication. The prediction of act 4-1 can be made in accordance with one or more modes, including those illustrated as modes 4-1-A through 4-1-C in FIG. 4 and discussed subsequently herein.

Act 4-2 of the example method of FIG. 4 comprises generating, for transmission on the downlink from eNodeB 28 to the wireless terminal, an uplink grant message (such as grant message 60 illustrated in FIG. 2). The uplink (UL) grant message, in accordance with the prediction, prioritizes a predicted L3 message of the wireless terminal relative to messages of others of plural wireless terminals operating in the network. In an illustrated embodiment, the uplink (UL) grant message can be generated by uplink grant message generator 54.

Act 4-3 of the example method of FIG. 4 comprises transmitting the uplink grant message to the prioritized wireless terminal. The uplink (UL) grant message (e.g., grant message 60 of FIG. 2) is transmitted over air interface 32 using node transceiver 40 and is received via terminal transceiver 70 of the addressed, prioritized wireless terminal 30.

As further explained herein, using the RRC state of the wireless terminal 30, uplink (UL) scheduler 50 of eNodeB 28 can predict the type and size of the corresponding L3 message to be sent. In this way an appropriate uplink (UL) grant can be sent already at the reception of a scheduling request (SR) sent from the wireless terminal to eNodeB 28. The uplink (UL) scheduler 50 of eNodeB 28 can then prioritize the L3 message, and save both a buffer status report (BSR) and signaling delay. That is, as explained herein, transmitting of the uplink grant message 60 to the wireless terminal(s) in accordance with the method of FIG. 4 and/or as described herein obviates transmission on the uplink from the wireless terminal of a separate buffer status report message preparatory to transmission of the uplink L3 message from the wireless terminal. Obviating the separate buffer status report message advantageously decreases signaling delay and overhead.

In various alternative and/or cumulative modes, the prediction of the method can be made in different ways. Three example modes/embodiments/cases are illustrated in general, representative fashion in FIG. 4. In an example first mode depicted by act 4-1-A, the prediction can be based on transmission of an evocative downlink L3 message. In a second example mode depicted by act 4-1-B, the prediction can be based on a pending buffer estimation for a buffer of the wireless terminal. In a third example mode depicted by act 4-1-C, the prediction can be based on anticipated periodicity of the uplink L3 message. Each of these example modes are described further below.

Figure 5:
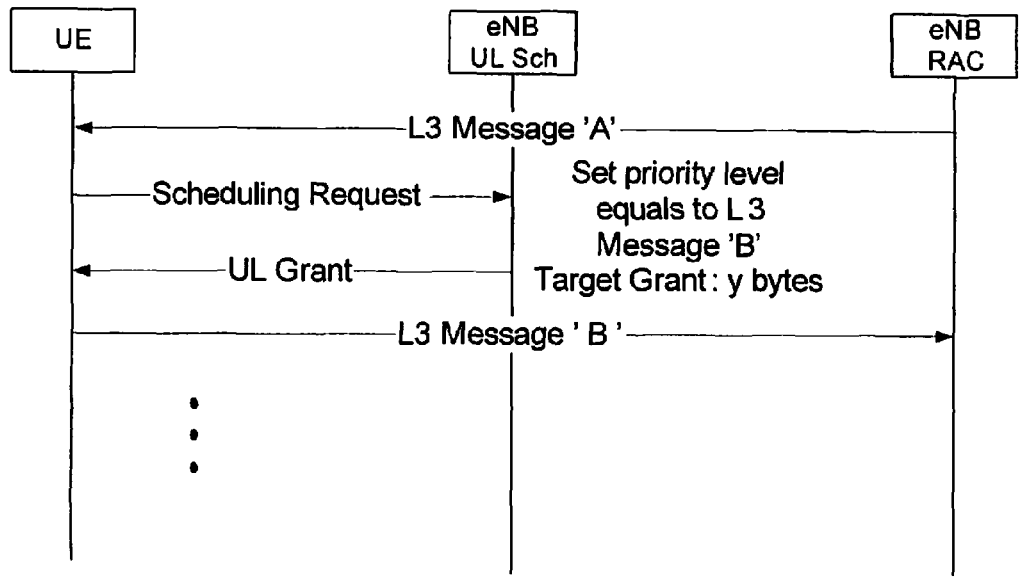
FIG. 5 is a diagrammatic view showing communications involved in radio resource control message scheduling including prioritization and grant allocation based on a predicated L3 message.

Regardless of what mode or embodiment of prediction is employed, in many cases the L3 message can be identified when a scheduling request (SR) is received from a wireless terminal. The priority of the L3 message which is the subject of the prediction can be set equal to the priority level of the predicted L3 message, as shown in FIG. 5. Moreover, a grant size for the anticipated L3 message (also known herein as a "target grant" or "target grant size" can be established and included in the uplink (UL) grant message.

The grant size for the permitted message can be set based on the knowledge of the L3 message. For example, and as shown in FIG. 5, it may be predicted that the expected L3 message is a Message B type message and therefore has a size of y number of bytes. Such type of prediction and assumption can be made in certain circumstances in which the network can know with relative certainty or reasonableness what type of L3 message is to be expected on the uplink (UL). For example at the initial connection setup procedure, the target grant for the UL L3 message (e.g., for Message B) can be set equal to y number of bytes. Otherwise, the uplink scheduler 50 can set the target grant size (based on buffer estimate) equal to z bytes, where z≥y+size of a buffer status report (BSR).

In the case that uplink transmission is not predicted, the current solution is described in 36.321 V8.0.0 (2007-12), 3rd Generation Partnership Project, Technical Specification Group Radio Access Network; Evolved Universal Terrestrial Radio Access (E-UTRA), Medium Access Control (MAC) protocol specification, (Release 8), which is incorporated herein by reference.

Upon reception of an uplink grant (in the form of uplink (UL) grant message 60), the wireless terminal 30 to which the grant message is directed can cancel the buffer status report if the grant is big enough to accommodate all pending data but not big enough to accommodate both the BSR and all pending data. With this method, unnecessary buffer status report signaling is avoided. Comparing FIG. 1 (no predicting of RRC signaling) and FIG. 5 (with predicting by uplink (UL) scheduler 50) of RRC signaling), it can be seen that both signaling delay and unnecessary signaling is avoided using uplink (UL) scheduler 50, so that network resources are more efficiently utilized.

First Mode/Embodiment/Case: L3 Message Prediction

In an example first mode depicted by act 4-1-A and FIG. 6, the prediction performed by uplink (UL) scheduler 50 can be based on transmission of an evocative downlink L3 message. That is, the prediction can be based, e.g., on downlink transmission of a downlink L3 message which is expected to result in generation of a certain type of responsive or expected L3 message on the uplink (UL)). The example shown in FIG. 6 describes L3 signaling from a wireless terminal 30 in idle state until the initial radio bearer (RB) has been setup. After the wireless terminal 30 has performed the initial connection setup (which starts with a random access procedure), the state of the wireless terminal 30 changes from RRC_Idle to RRC_Connected. In RRC_connected state, before a radio bearer (RB) is configured, no user traffic data can be transmitted. If a 'Measurement Report' is not configured by the network, there is only one SRB1 in the uplink carrying different L3 messages.

Based on the knowledge of a downlink (DL) L3 message transmission from eNodeB 28 to wireless terminal 30, a corresponding uplink L3 message from wireless terminal 30 can be predicted by uplink (UL) scheduler 50. The DL L3 message of FIG. 6, also labeled as message 6-0, is included in the initial setup procedure. The DL L3 message of FIG. 6 (i.e., message 6-0) can also be referred to as the RRC CONNECTION RECONFIGURATION message. The eNodeB 28 can use this message to request the wireless terminal to reconfigure the user data radio bearer. When wireless terminal 30 has finished processing the downlink (DL) layer 3 (L3) message 6-0 (RRC CONNECTION RECONFIGURATION message) and has completed building up an uplink L3 message which is responsive to or results from the DL L3 message, wireless terminal 30 sends a scheduling request (SR) to eNodeB 28. Such scheduling request (SR) being shown as message 6-1 in FIG. 6.

Upon reception by eNodeB 28 of the scheduling request (SR) message 6-1, the uplink (UL) scheduler 50 of eNodeB 28 assumes that the scheduling request (SR) message 6-1 is for the anticipated uplink (UL) L3 message (Message C in FIG. 6) which was evoked by the DL L3 message. Therefore, the uplink (UL) scheduler 50 sets the priority level of the anticipated uplink (UL) L3 message (Message C) as at SRB 1, and sets the target grant size as the size of the type of L3 message that is expected. In the example of FIG. 6, uplink (UL) scheduler 50 sets the grant size as z number of bytes, based on the type of uplink (UL) L3 message which is anticipated. The uplink (UL) grant message 60, of z byte size, is prepared by uplink grant message generator 54 and sent on the downlink to wireless terminal 30 via node transceiver 40. The uplink (UL) grant message is depicted as message 6-2 in FIG. 6. The uplink (UL) grant message 6-2 thus permits the wireless terminal 30 to send its uplink (UL) message (Message C) to eNodeB 28. The uplink (UL) message (Message C) is also depicted as message 6-3 in FIG. 6. The uplink (UL) message (Message C) is known as the RRC CONNECTION RECONFIGURATION COMPLETE message, which is used for the UE to reply to the eNodeB, and to notify the eNodeB 28 that the user Data RB Configuration is Complete. Thus, scheduler 50 has the ability to prioritize the response to the scheduling request (SR) according to whatever policy it has for the SRB1 messages before it gets a Buffer Status Report (BSR) saying that the wireless terminal wants to transmit a SRB1.

In FIG. 6, Message A can be, for example, a UL Direct Transfer or RRC Connection Complete message, depending on 3GPP implementation. Before receipt of the userDataRBConfiguration complete message, only one signal radio bearer (SRB) is transmitting. Therefore, the size of the target grant at that time can be set as the size of the expected L3 message. After receipt of the userDataRBConfiguration complete message, there may be multiple radio bearers. Therefore, at that time the size of the target grant can be set as the arbitrary value c number of bytes, z is greater than the size of 'C'+BSR. To this end FIG. 6 thus serves to illustrate another example implementation of the technology, and particularly an example implementation wherein, in the beginning of setting up a radio bearer, there is only RRC control signaling that needs to be transmitted. Therefore eNodeB 28 knows the serving radio base station type and the size. The eNodeB 28 can prioritize and schedule the expected RRC message. After the radio bearer is indeed setup, the data is not known. So the eNodeB 28 can give a grant of an arbitrary size which is greater than the size of a BSR plus the message. Then the wireless terminal will prioritize the Buffer Status Report (BSR) in case there is more data (independent of priority). So in order to be certain that the whole message is transmitted, the grant should be size of message plus size of Buffer Status Report (BSR).

Second Mode/Embodiment/Case: Prediction Based on Pending Buffer Estimation

Figure 7:
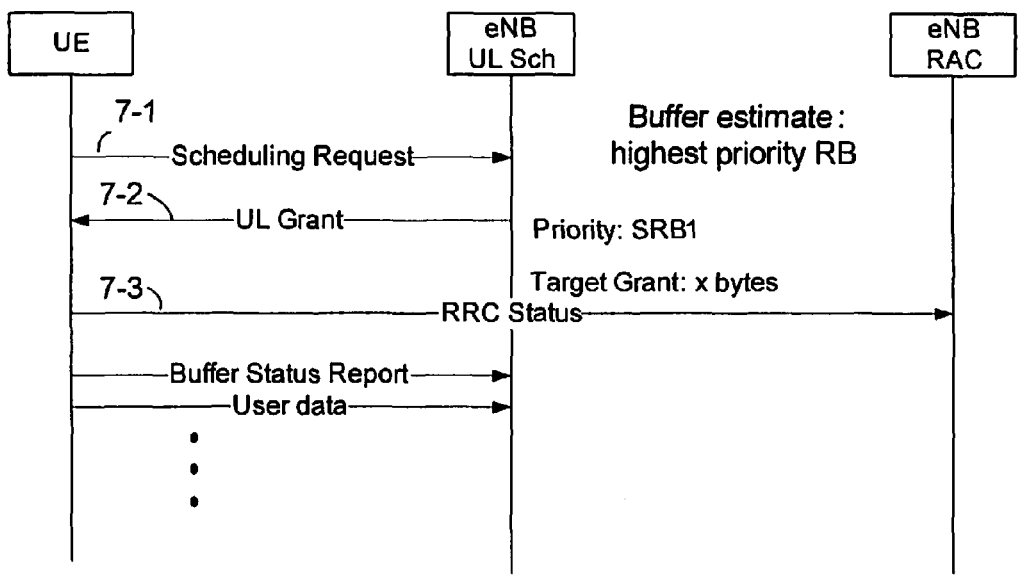
FIG. 7 is a diagrammatic view showing communications involved in radio resource control message scheduling including prioritization and grant allocation based on the pending buffer estimation.

In a second example mode depicted by act 4-1-B and FIG. 7, the prediction performed by uplink (UL) scheduler 50 can be based on a pending buffer estimation for a buffer of the wireless terminal, e.g., for terminal buffer 76 of wireless terminal 30 as shown in FIG. 3. This second mode particularly employs the terminal buffer estimator 56 aforementioned in conjunction with FIG. 2.

The terminal buffer estimator 56 of eNodeB 28 is used to make and maintain an estimate of the size and the state of the buffer 76 of a wireless terminal. In fact, such estimate is made and maintained separately by terminal buffer estimator 56 for each of the wireless terminals (WT) 30 served by eNodeB 28, although operation with respect to only one such wireless terminal 30 is now described. The terminal buffer estimator 56 makes its own estimate of the amount of data in the terminal buffer(s) 76 which is intended for transport to eNodeB 28, such amount of data being the buffer size. Thus, as used herein, "buffer size" and the like refers to actual size or quantity (typically in bytes) of contents of the buffer, not ultimate buffer capacity. For each wireless terminal 30 the terminal buffer estimator 56 makes and maintains its estimate in accordance with the Buffer Status Reports (BSRs) and Scheduling Requests (SRs) which are sent from the wireless terminals to eNodeB 28. It will be recalled that a Buffer Status Report (BSR) includes, e.g., detailed information about the buffers of the wireless terminal from which the Buffer Status Report (BSR) is sent, including the size (e.g., bytes of content) of the buffers per radio bearer (RB) group. The terminal buffer estimator 56 operates essentially independently of uplink (UL) scheduler 50, but is updated based on decisions and actions of uplink (UL) scheduler 50. For example, the estimated size or magnitude of the buffer estimate for a particular wireless terminal is diminished by the grant size when a grant message 60 is sent to the particular wireless terminal and the number of bytes corresponding to the grant size is received by eNodeB 28. That is, the running estimate of the buffer size for the wireless terminal has subtracted from it the grant size when a uplink (UL) grant message 60 is sent to the wireless terminal. Likewise, the estimate of the buffer size can be increased by an appropriate amount upon reception of a Buffer Status Report (BSR) which reports size of the wireless terminal's buffer. An attempt is made by terminal buffer estimator 56 to determine the appropriate amount of the increase of the estimate of the buffer size in a manner so as not to doubly include any previously reported buffer contents.

If the radio condition or resource allocated to the wireless terminal permits, uplink (UL) scheduler 50 via uplink grant message generator 54 will issue its uplink (UL) grant message so that buffer 76 of the addressed wireless terminal can be emptied. However, emptying of the buffer 76 is not always possible and thus not always permitted. For one reason, the size of the grant included in the grant message cannot exceed the size of a transport block which is predefined for communications between eNodeB 28 and the wireless terminal. This can be problematic if the size of buffer 76 (e.g., the contents of buffer 76) is too large (e.g., exceeds the size of the transport block). The transport block size is the maximum grant that the uplink (UL) scheduler 50 allows a wireless terminal to transmit, which in many cases is smaller than the buffer size. As other reasons, channel limitations and/or network resource restriction may not permit allocation of not enough resource for sending all the data in the buffer of a wireless terminal. Therefore, in such situations, there will be some pending data left in the buffer (e.g., left from a previous subframe). But in such situation eNodeB 28 knows (for example, based on the previous Buffer Status Report (BSR) and/or maximum transport block size), which data remaining in the buffer belongs to what radio bearer (RB) type and how much data is left.

Thus, the estimated buffer size (e.g., as maintained by terminal buffer estimator 48) can be used in various situations to making a prediction of transmission of an uplink layer three (L3) message from a wireless terminal to a node of the radio access network. One such situation involves a scenario such as that alluded to above in which the eNodeB 28 knows that, in its previous message transmitted to eNodeB 28, a wireless terminal was not able to send its full buffer, and that the not-sent portion of the buffer includes a L3 message or a traffic RB that has highest priority. In such situation, when the eNodeB receives a next scheduling request (SR) from that UE, the eNodeB has foreknowledge that likely a L3 message is to be sent from that wireless terminal. As mentioned above, the eNodeB 28 has such foreknowledge based on earlier-received Buffer Status Reports (BSRs) from the wireless terminal.

Another such situation can occur when a wireless terminal, after already having sent a message to eNodeB 28, receives in its buffer a higher priority radio bearer (RB) than any other RB presently in the buffer (which may not have been exhausted upon transmission of the last message to eNodeB 28). Reception of this higher priority radio bearer (RB) in its buffer enables or prompts the wireless terminal to send another scheduling request (SR) to eNodeB 28. The eNodeB 28 discerns (e.g., by the timing of receipt of this scheduling request (SR)) that an interesting high priority radio bearer (RB) [which eNodeB 28 presumes is a L3 message or signaling radio bearer (SRB)] is in the buffer of the wireless terminal. Therefore, when the scheduling request (SR) is received by eNodeB 28, the uplink (UL) scheduler 50 treats the scheduling request (SR) with dispatch and prioritizes the anticipated message in the sending of grant message 60.

In the example situation illustrated in FIG. 7, an uplink (UL) RRC message is prioritized based on the buffer estimation results. For understanding FIG. 7 it is assumed that, according to the estimate maintained by terminal buffer estimator 56, one or more radio bearers (RBs) are left in the buffer of a particular wireless terminal after transmission of the last message from that wireless terminal, and that the highest priority of the residual radio bearers (RBs) in the buffer is of a certain priority level. In the situation of FIG. 7, new data arrives in the buffer for the wireless terminal, and that the new data (new radio bearer) entered into the buffer has a priority which is higher than any of the residual radio bearers (RBs) in the buffer. Upon entry of the new highest priority data into the buffer, the wireless terminal issues a scheduling request (SR) shown as message 7-1 in FIG. 7. Upon receipt of the scheduling request (SR) 7-1, terminal buffer estimator 56 of eNodeB 28 concludes that new data has arrived in the buffer of the wireless terminal and that such new data has a higher priority level than the highest priority residual radio bearer (RB) previously in the buffer. The terminal buffer estimator 56 communicates this information to uplink (UL) scheduler 50, and uplink (UL) scheduler 50 concludes/predicts that the new data is a L3 message. Therefore, uplink (UL) scheduler 50 sets the priority for a next message from the wireless terminal at priority level of SRB1, and sends the priority level and target grant (number of bytes) to the wireless terminal in a grant message 7-2. Since, in this situation, the exact RRC signaling cannot be predicted, the default target grant of x number of bytes is allocated in grant message 7-2. The ensuing uplink (UL) message from wireless terminal is depicted in FIG. 7 as RRC status message 7-3.

Third Mode/Embodiment/Case: Prediction Based on Periodically Reported Uplink Transmission In a third example mode depicted by act 4-1-C and FIG. 8, the prediction performed by uplink (UL) scheduler 50 can be based on anticipated periodicity of a transmission such as an uplink L3 message. In the scenario illustrated by and described with reference to FIG. 8, a measurement report is featured, and the uplink transmission can be predicted based on the periodicity of the RRC transmission period.

Figure 8:
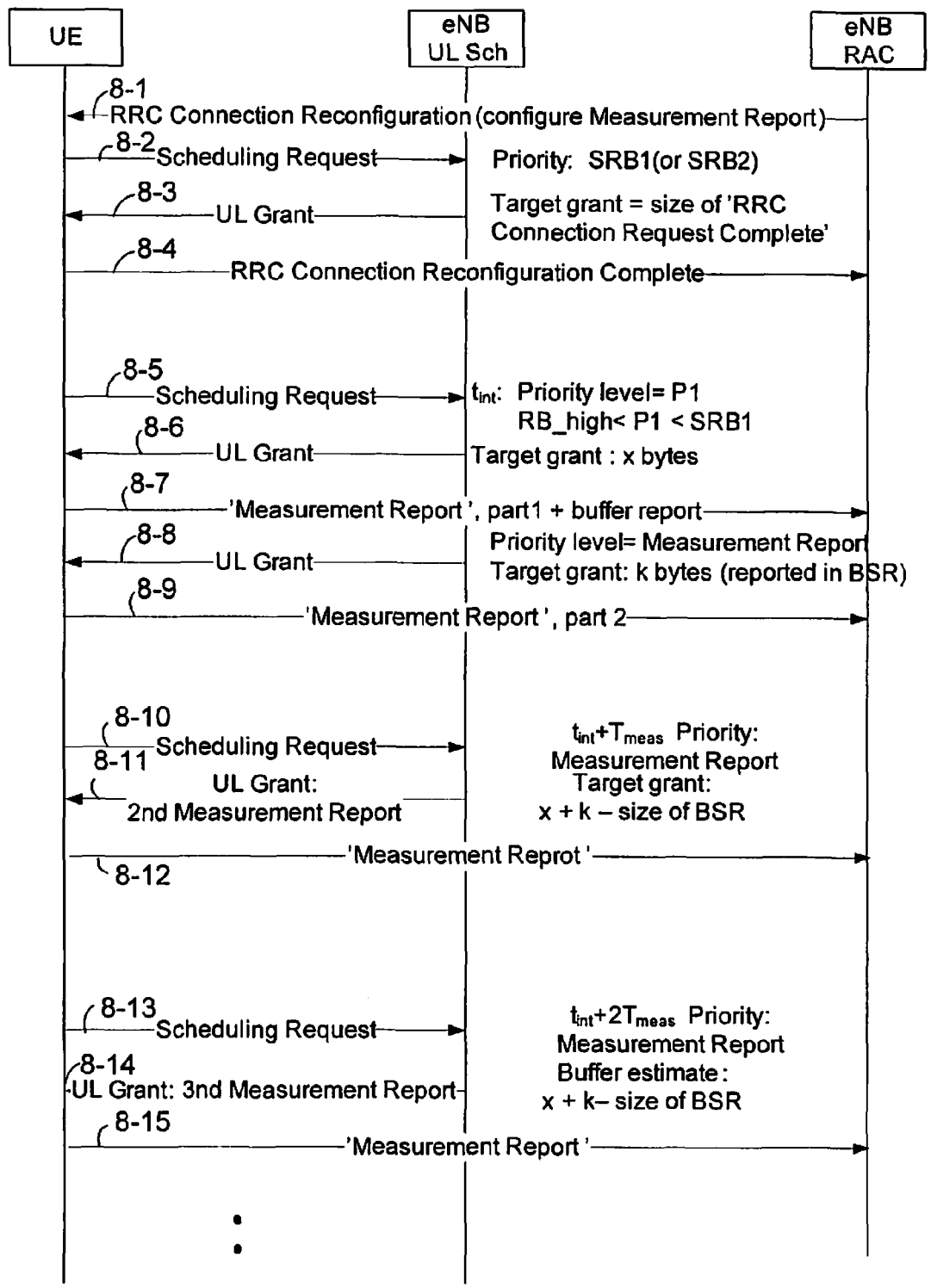
FIG. 8 is a diagrammatic view showing communications involved in radio resource control message scheduling including prioritization and grant allocation based on periodicity of an uplink L3 message.

In FIG. 8, a RRC Connection Reconfiguration message 8-1 is sent on the downlink (DL) from eNodeB 28 to request the wireless terminal to configure its measurement report. Upon receiving a scheduling request (SR) message 8-2 from the wireless terminal, uplink (UL) scheduler 50 of eNodeB 28 predicts that the wireless terminal will send a RRC Connection Reconfiguration Complete message (message 8-4) in response to the RRC Connection Reconfiguration message 8-1. Both the RRC Connection Reconfiguration message 8-1 and the anticipated RRC Connection Reconfiguration Complete message 8-4 can be SRB1 or SRB2 (The priority is set correspondingly and the grant size is equal to the size of this message). Upon making such prediction and receipt of the scheduling request (SR) message 8-2, the uplink (UL) scheduler 50 causes uplink grant message generator 54 to send a grant message 8-3. Upon receipt of the uplink grant message 8-3, the wireless terminal does in fact send RRC Connection Reconfiguration Complete message 8-4 to eNodeB 28.

In contrast to convention practice, the scenario of messages of FIG. 8 as just described reduce the delay by one round trip transmission time (RRT) for transmitting one L3 message. The method of FIG. 8 is also able to allocate the grant for the exact message size, thus rendering resource allocation and usage more efficient.

Continuing with the scenario of FIG. 8, after a measurement report is triggered, the wireless terminal starts to measure, e.g., the radio quality. When the measurement reporting criteria is fulfilled, the wireless terminal prepares to send a first transmission Measurement Report, which is a L3 message depicted as message 8-7 in FIG. 8. The Measurement Report message 8-7 can be carried in signaling radio bearer SBR1 or SRB2. The first transmission of Measurement Report message 8-7 is not known by eNodeB 28, because eNodeB 28 does not yet know when the wireless terminal is going to transmit and also there might be a situation in which that wireless terminal has some other data in the its buffer (for example, another L3 message or other ongoing traffic data). But on the reception of scheduling request (SR) message 8-5 at time $t_{int}$, the uplink (UL) scheduler 50 of eNodeB 28 sets the priority level for the anticipated message 8-7 between that of the highest normal traffic data and that of SRB 1, and the buffer estimate is equal to x bytes. Then uplink (UL) scheduler 50 directs uplink grant message generator 54 to send a grant message 8-6 accordingly.

If it assumed in the FIG. 8 scenario that the x number of bytes as granted by grant message 8-6 is not enough for the size of the Measurement Report message 8-7 for the first uplink transmission, a first part of the Measurement Report is transmitted as message 8-7 together with a new Buffer Status Report (BSR). Upon reception of BSR included in message 8-7, eNodeB 28 (and terminal buffer estimator 56 particularly) knows realizes that a second part of Measurement Report is to be expected as message 8-9, and terminal buffer estimator 56 can deduce the size of the anticipated second part Measurement Report message 8-9. Therefore, in accordance with such prediction and expectation, uplink (UL) scheduler 50 sets a priority level for the anticipated second part Measurement Report message 8-9 (e.g., as SRB1 (or SRB2 depending on the 3GPP definition). The uplink (UL) scheduler 50 further knows the buffer estimate from terminal buffer estimator 56 as being equal to k bytes, which was deduced based on Buffer Status Reports (BSRs). Using this information the uplink (UL) scheduler 50 directs uplink grant message generator 54 to send grant message 8-8, which includes the priority level and grant size for the anticipated second part Measurement Report message 8-9. The second part of Measurement Report message 8-9 is transmitted by the wireless terminal to eNodeB 28 after the wireless terminal receives the grant message 8-8.

At this point, the time that the wireless terminal is going to transmit the next Measurement Report can be predicated by eNodeB 28. This time is equal to $t_{int}+T_{meas}$, where $t_{int}$ is the time instant when the initial measurement report was received, and $T_{meas}$ is the periodicity of the measurement reporting. Since, during the measurements, the size of the Measurement Report does not change, the size of the Measurement Report can be predicted as well x+k−size of BSR. In case the wireless terminal has not reported data for other priority queues (PQs)/; logical channels, the size of Buffer Status Report (BSR) can be ignored. Here "Priority Queue" refers to, e.g., a representation (encapsulation) of the different parameters that determine how a data stream shall be prioritized against/relative to other data streams At time instance $t_{int}+T_{meas}$, upon reception of scheduling request (SR) message 8-10, the priority level is set to equal to the priority level for a SRB which is used to carry a Measurement Report. The uplink grant message 8-11 can be assigned for the $2^{nd}$ Measurement Report message 8-12, based on the buffer estimate being equal to x+k−size of the Buffer Status Report (BSR).

For the 3$^{rd}$ Measurement Report of message 8-15, the above method can also be applied. At time instance $t_{int}$+ 2$T_{meas}$, upon reception of scheduling request message 8-13, the priority level is set to equal the priority level for the SRB which is used to carry a Measurement Report. The uplink grant for grant message 8-14 can be assigned for the 3$^{rd}$ Measurement Report message 8-15, based on the buffer estimate being equal to x+k−size of Buffer Status Report (BSR).

The allocation of the Measurement Report is stopped when the criteria is not met or handover command is triggered.

With the modes and methods described herein and encompassed by this technology, some of the uplink transmissions can be predicted and the prioritization and uplink transmission allocation can be accomplished without introducing extra control signaling delay. Also, resources can be allocated and utilized more efficiently by using the exact signaling size, and unnecessary buffer status reports are delightfully avoided.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims.

What is claimed is:

1. A node of a radio access network comprising:
   a transceiver configured to facilitate communication with wireless terminals over a radio interface including transmissions on an uplink from the wireless terminals to the node and transmissions on a downlink from the node to the wireless terminals; and
   a radio resource control unit configured to perform radio resource control functionality including layer three (L3) signaling between the node and the wireless terminals wherein the radio resource control unit comprises:
   an uplink scheduler configured to make a prediction of a transmission of an uplink L3 message from the wireless terminals to the node and, for a particular wireless terminal for which the prediction is made, to generate, for transmission on the downlink, a grant message which in accordance with the prediction prioritizes a predicted L3 message of the particular wireless terminal relative to messages of others of the wireless terminals, wherein the uplink scheduler is configured to make the prediction based on at least one of
   a transmission of an evocative downlink L3 message, and
   a pending buffer size estimation for a buffer of the particular wireless terminal.

2. The node of claim 1, wherein the transmission of the grant message to the particular wireless terminal obviates transmission on the uplink from the particular wireless terminal of a separate buffer status report message preparatory to transmission of the uplink L3 message from the particular wireless terminal, thereby decreasing signaling delay and overhead.

3. The node of claim 1, wherein the uplink scheduler is configured to generate the grant message to allocate capacity to accommodate a buffer status report of a buffer of the particular wireless for the uplink L3 message.

4. The node of claim 1, wherein the prediction based on the pending buffer estimation for the buffer of the wireless terminal is based on a previous buffer status report or a priority level of data in the buffer.

5. The node of claim 1, wherein the uplink scheduler is configured to make the prediction based on anticipated periodicity of the uplink L3 message.

6. The node of claim 1, wherein the uplink scheduler is configured to generate the grant message to include an uplink transmission allocation prioritization value for the uplink L3 message.

7. The node of claim 1, wherein the uplink scheduler is configured to generate the grant message to include an uplink transmission allocation size for the uplink L3 message.

8. A method of operating a radio access network comprising:
   making a prediction of a transmission of an uplink layer three (L3) message from a wireless terminal to a node of the radio access network, wherein the prediction is based on at least one of
   transmission of an evocative downlink L3 message, and
   a pending buffer size estimation for a buffer of the wireless terminal;
   generating, for a transmission on a downlink from the node to the wireless terminal, a grant message which, in accordance with the prediction, prioritizes a predicted L3 message of the wireless terminal relative to messages of others of wireless terminals operating in the radio access network; and
   transmitting the grant message to the wireless terminal.

9. The method of claim 8, wherein transmitting of the grant message to the wireless terminal obviates transmission on the uplink from the wireless terminal of a separate buffer status report message preparatory to transmission of the uplink L3 message from the wireless terminal, thereby decreasing signaling delay and overhead.

10. The method of claim 8, wherein the grant message allocates ca allocates capacity to accommodate a buffer status report of a buffer of the particular wireless for the uplink L3 message.

11. The method of claim 8, wherein the prediction based on the pending buffer estimation for the buffer of the wireless terminal is based on a previous buffer status report or a priority level of data in the buffer.

12. The method of claim 8, further comprising making the prediction based on anticipated periodicity of the uplink L3 message.

13. The method of claim 8, further comprising generating the grant message to include an uplink transmission allocation prioritization value for the uplink L3 message.

14. The method of claim 8, further comprising generating the grant message to include an uplink transmission allocation size for the uplink L3 message.

* * * * *

UNITED STATES PATENT AND TRADEMARK OFFICE
CERTIFICATE OF CORRECTION

PATENT NO. : 8,547,917 B2  
APPLICATION NO. : 12/935025  
DATED : October 1, 2013  
INVENTOR(S) : Sun et al.

Page 1 of 1

It is certified that error appears in the above-identified patent and that said Letters Patent is hereby corrected as shown below:

In the Drawings

In Fig. 1, Sheet 1 of 7, delete "Buffer Status Repor" and insert -- Buffer Status Report --, therefor.

In the Specification

In Column 2, Line 43, delete "a the" and insert -- the --, therefor.

In Column 3, Line 66, delete "(B SR)," and insert -- (BSR), --, therefor.

In Column 12, Line 39, delete "terminal buffer estimator 48)" and insert -- terminal buffer estimator 56) --, therefor.

In the Claims

In Column 16, Line 50, in Claim 10, delete "allocates ca allocates" and insert -- allocates --, therefor.

Signed and Sealed this
Fourth Day of February, 2014

Michelle K. Lee
*Deputy Director of the United States Patent and Trademark Office*